(12) United States Patent
Laubach (10) Patent No.: US 9,459,700 B2
(45) Date of Patent: Oct. 4, 2016

(54) KEYBOARD WITH NTEGRATED TOUCH SURFACE

(71) Applicant: Intellitact LLC, Beverly Hills, CA (US)

(72) Inventor: Kevin Laubach, Beverly Hills, CA (US)

(73) Assignee: Intellitact LLC, Beverly Hills, CA (US)

( * ) Notice: Subject to any disclaimer, the term of this patent is extended or adjusted under 35 U.S.C. 154(b) by 21 days.

(21) Appl. No.: 14/659,039

(22) Filed: Mar. 16, 2015

(65) Prior Publication Data

US 2015/0185865 A1 Jul. 2, 2015

Related U.S. Application Data (63) Continuation of application No. 13/489,021, filed on Jun. 5, 2012, now Pat. No. 8,982,069, which is a continuation-in-part of application No. 13/423,212, filed on Mar. 17, 2012, now Pat. No. 8,760,424.

(60) Provisional application No. 61/493,525, filed on Jun. 6, 2011, provisional application No. 61/493,523, filed on Jun. 6, 2011, provisional application No. 61/465,308, filed on Mar. 17, 2011, provisional application No. 61/465,345, filed on Mar. 17, 2011, provisional application No. 61/465,309, filed on Mar. 17, 2011.

(51) Int. Cl.
G06F 3/02 (2006.01)
G06F 3/0354 (2013.01)
G06F 3/0488 (2013.01)

(52) U.S. Cl.
CPC ......... G06F 3/0213 (2013.01); G06F 3/03547 (2013.01); G06F 3/04883 (2013.01); G06F 2203/04808 (2013.01)

(58) Field of Classification Search
None
See application file for complete search history.

(56) References Cited

U.S. PATENT DOCUMENTS

| | | | |
|---|---|---|---|
| 5,841,423 A | 11/1998 | Carroll et al. | |
| 7,170,489 B2 | 1/2007 | Sterling | |
| 7,659,887 B2 | 2/2010 | Larsen et al. | |
| 8,754,854 B1 | 6/2014 | Hamburgen et al. | |
| 2002/0030667 A1 | 3/2002 | Hinckley et al. | |
| 2003/0043123 A1 | 3/2003 | Hinckley et al. | |
| 2005/0140653 A1 | 6/2005 | Pletikosa et al. | |
| 2006/0209031 A1 | 9/2006 | Burrell, IV | |
| 2007/0139395 A1 | 6/2007 | Westerman et al. | |
| 2009/0091535 A1 | 4/2009 | Ure | |
| 2009/0195418 A1 | 8/2009 | Oh | |
| 2010/0085313 A1* | 4/2010 | Rider .................. | G06F 3/04886 345/173 |

OTHER PUBLICATIONS

International Search Report and Written Opinion for PCT/US12/40895, Aug. 1, 2012, 12 pages.

\* cited by examiner

*Primary Examiner* — Kenneth B Lee, Jr.
(74) *Attorney, Agent, or Firm* — Los Angeles Patent Group; Arman Katiraei (57) ABSTRACT

Some embodiments provide a single integrated multi-functional input device (1) that provides the discrete input functionality of a keyboard to facilitate efficient text insertion operations and (2) that provides the functionality of a trackpad to facilitate efficient spatially dependent navigation in a graphical user interface (GUI) whereby each such functionality is accessible by the user's hands positioned at the home position keys of the keyboard. More specifically, some embodiments provide an enhanced keyboard with at least one touch sensitive key and software for adapting touches applied over the touch sensitive key to emulate trackpad functionality without interfering with regular text insertion (typing).

19 Claims, 9 Drawing Sheets

Prior Art

KEYBOARD WITH NTEGRATED TOUCH SURFACE

CLAIM OF BENEFIT TO RELATED APPLICATIONS

This application is a continuation of U.S. non-provisional application Ser. No. 13/489,021, entitled "Keyboard with Integrated Touch Surface", filed Jun. 5, 2012 which claims the benefit of U.S. provisional application 61/493,525, entitled "Keyboard with Integrated Trackpad Functionality", filed Jun. 6, 2011, U.S. provisional patent application 61/493,523, entitled "Enhanced Pointer Tools for Graphical User Interfaces", filed Jun. 6, 2011, and is a continuation-in-part of U.S. non-provisional patent application Ser. No. 13/423,212 entitled "Touch Enhanced Interface" filed Mar. 17, 2012 which claims the benefit of U.S. provisional application 61/465,309, entitled "Touch Enhanced Interface", filed Mar. 17, 2011, U.S. provisional application 61/465,308, entitled "Keyboard Enhanced Interface", filed Mar. 17, 2011, and U.S. provisional application 61/465,345, entitled "Input Device User Interface Enhancements", filed Mar. 17, 2011. The contents of provisional applications 61/493,525, 61/465,309, 61/465,308, 61/465,345, and 61/493,523 and non-provisional applications 13/489,021 and 13/423,212 are hereby incorporated by reference.

TECHNICAL FIELD

The present invention generally relates to software and hardware user interface enhancements for input devices on computer systems and electronic devices.

BACKGROUND ART

The keyboard is an integral component to many computer systems and remains the primary means to insert (type) text. In the many years since its introduction, the keyboard has had some evolution such as the introduction of function keys, numeric keypads, and navigation keys. Nevertheless, these evolutionary enhancements have failed to overcome the keyboard's inability to efficiently navigate a graphical user interface (GUI) and invoke output actions therein. Specifically, the GUI exists as a spatially dependent interface whereby access to many of the different features and functionality of the computing system is obtained by interacting with various GUI elements (e.g., icons, menus, sliders, etc.) that graphically represent the features and functionality on-screen. Such interactions occur using one or more spatially dependent input devices such as a mouse, trackpad, or touchscreen surface. As a result, the keyboard remains relegated substantially to text insertion while a second input device is used to navigate and interact with the GUI.

Figure 1:
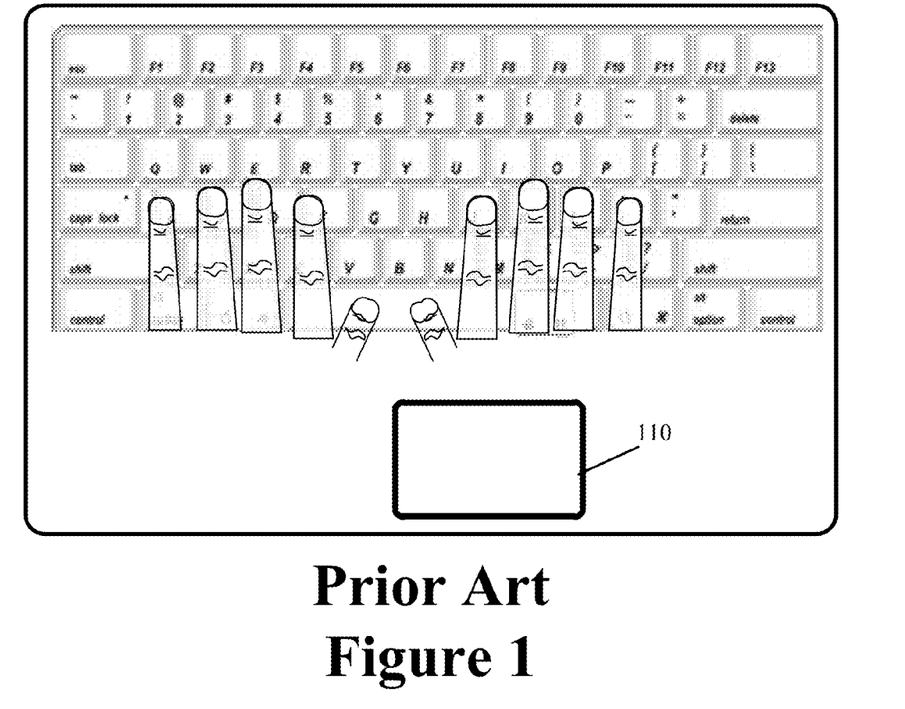
FIG. 1 illustrates a prior art integration of a trackpad below a full keyboard on many laptop computing systems.

Trackpad usage is becoming more prevalent as these input devices are commonly included in addition to full keyboards on typical laptop computing systems. As shown in FIG. 1, a trackpad 110 is often included below a full keyboard on many laptop computing systems. Trackpad usage is also becoming more prevalent as advanced trackpad functionality enables more efficient and quicker access to alternate functionality. For example, a multi-touch trackpad allows one or more detected touches to select a GUI element, and movement of one or more detected touches to drag the selected GUI element.

However efficient in the navigation of the GUI, the trackpad and other spatially dependent input devices are not ergonomically satisfactory nor reliably accurate when performing text insertion or typing operations. As a result, efficient usage of many computer systems remains dependent on at least two input devices: (1) the keyboard and (2) a spatially dependent input device such as a trackpad. While usage of two separate input devices allows a user to leverage the advantages of each input device when most appropriate, this dual input device usage nevertheless lends itself to sub-optimal operation of the computer system. Specifically, users waste time repeatedly moving their hands from one input device to the other and back again. Each such physical transition is preceded by a mental process to determine if such a transition is more or less laborious. For instance, the user may have to quickly gauge whether it would be preferable to use the backspace or delete keys many times and then re-type text, or use a pointer to reposition the cursor, make a correction, and then replace the cursor. As another example, a user may want to perform an action such as "save" and so must decide if they are certain of that key command in the current application, or if they should instead transition to the pointing device to invoke the command from a menubar, where they can visually confirm the location of the command prior to invocation. A single such transition may seem inconsequential, however there may be hundreds or even thousands of such transitions in a day of computing usage, which adds up to a significant amount of wasted time and effort. Moreover, the wasted time is compounded by the fact that transitioning to the keyboard requires the user to reposition her/his hand correctly over the home positions of the keyboard before resuming typing (i.e., the "A", "S", "D", and "F" keys for the left hand and the "J", "K", "L", and ";" keys for the right hand). If the user's hand is incorrectly positioned, the user will erroneously enter text that must then be undone or deleted before correctly reentering the text. In addition to wasted time, these scenarios can frustrate or otherwise distract the user from accomplishing their work. Also, after months or years of such repetition, the user my develop ailments such as repetitive stress injuries (RSI).

By positioning the trackpad below or adjacent to the keyboard, some computing systems attempt to reduce the time wasted in transitioning between input devices. Though this reduces the distance the user's hand must travel, it still requires the user to move her/his hand away from the home position of the keyboard, thereby introducing the possibility of incorrect hand positioning and wasted time as a result of hand repositioning, loss of on-screen visual focus, and associated background cognitive shifting as mentioned above.

Accordingly, there is a need for a single input device that is both efficient in navigating a GUI and also efficient in performing text insertion or typing. There is thus a need for a single input device that properly assimilates and integrates the separate functionality of a keyboard and that of a trackpad. There is further a need to provide enhanced functionality beyond that of a traditional keyboard or trackpad so as to further evolve how one continuously navigates the GUI and performs text insertion operations.

SUMMARY

It is an objective of the present invention to provide a single integrated multi-functional input device (1) that provides the discrete input functionality of a keyboard to facilitate efficient text insertion operations and (2) that provides the functionality of a trackpad to facilitate efficient spatially dependent navigation in a graphical user interface (GUI) whereby each such functionality is accessible by the user's hands positioned at the home position keys of the keyboard, thereby eliminating the wasted time and frustration that results from having to repeatedly reposition one's hands in order to access different functionality associated with different input devices. It is further an objective to assimilate the functionality of these separate input devices in a manner that provides enhanced functionality for navigating the GUI and performing text insertion.

To achieve these and other objectives, some embodiments provide an enhanced keyboard with at least one touch sensitive key (such as the spacebar key), and software for adapting touches applied over the touch sensitive key to emulate trackpad functionality without interfering with regular text insertion (typing). This enhanced keyboard enables simultaneous, continuous, and unimpeded (1) discrete character insertion when using the keyboard keys to insert or type text and (2) trackpad functionality when using the touch sensitive functionality of the spacebar key to navigate the GUI without requiring hand repositioning from the normal home row text entry orientation. The enhanced keyboard also provides enhanced functionality that takes advantage of the assimilation of the keyboard and trackpad. Specifically, software operating in conjunction with the hardware identifies when the spacebar is held down such that touches that are applied on the spacebar (while being held down) enable various secondary functionality such as dragging, scrolling, and other functionality associated with touch gestures.

BRIEF DESCRIPTION OF THE DRAWINGS

In order to achieve a better understanding of the nature of the present invention, a preferred embodiment of the enhanced keyboard will now be described, by way of example only, with reference to the accompanying drawings in which.

DETAILED DESCRIPTION

Some embodiments provide a multi-functional input device that is an enhanced keyboard with at least one touch sensitive key and software for adapting touches applied over the touch sensitive key to emulate trackpad functionality without interfering with regular text insertion (typing). Said software may be stored on specialized hardware of the enhanced keyboard such as in a controller of the enhanced keyboard. In some such embodiments, the controller is implemented with firmware that is executed using an integrated circuit (IC) of the enhanced keyboard. The controller converts raw touch data sensed over the touch sensitive key(s) and keyboard key presses and key releases into appropriate real-time messages that are then communicated via an appropriate protocol such as USB or Bluetooth to the host device (i.e., the OS of the computing system). In other embodiments, said software or some portion thereof may be running on the host device itself as a discrete process or integrated into operating system components such as hardware drivers and low-level event processing.

Figure 2:
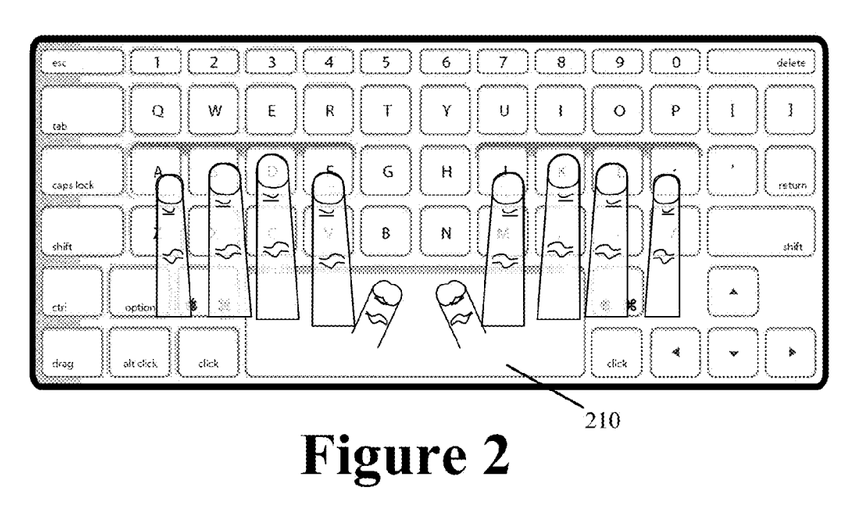
FIG. 2 illustrates the enhanced keyboard with a touch sensitive spacebar key that is enlarged with respect to a traditional spacebar key in order to provide a larger touch surface over which trackpad functionality can be emulated.

In a preferred embodiment shown in FIG. 2, the touch sensitive key is the spacebar key 210 that is enlarged with respect to a traditional spacebar key in order to provide a larger touch surface over which trackpad functionality can be emulated. The touch sensitive spacebar key 210 includes one or more touch sensitive layers that detect touch and motion over the key using capacitive, resistive, or other touch or presence sensing technologies such as optical or infrared, which would not necessarily require any touch sensitive layers. For the sake of clarity, subsequent text will refer to embodiments which employ touch sensitivity technologies. The enhanced keyboard embodiments of the present invention enable simultaneous, continuous, and unimpeded (1) discrete character insertion when using the keyboard keys to insert or type text and (2) trackpad functionality when using the touch sensitive functionality of the spacebar key 210 to navigate the GUI without requiring users to move their hands off of the home position keyboard keys. When at the home position keyboard keys, the natural resting position of the thumb of both hands is over the spacebar 210, so the thumb of either or both hands can therefore be used to perform various touch gestures or movements over the touch sensitive spacebar 210 without removing the other fingers from atop the home position keys.

The software of the enhanced keyboard, whether embedded or running on the host, ensures that touches applied over the touch sensitive spacebar 210 do not interrupt text insertion (typing) or otherwise produce unintended actions, while also allowing for seamless transitioning between text insertion and trackpad emulation. For example, when performing text insertion operations, the software does not interpret resting of the thumbs on the spacebar as a touch associated with trackpad emulation. Similarly, when the spacebar is held down and touches are applied on the spacebar, the software does not interpret the holding down of the spacebar as repeated space insertions, but rather as enabling various secondary trackpad emulations that are in accordance with some embodiments. Detail for how the software seamlessly transitions between text insertion and trackpad emulation is discussed below.

Figure 3:
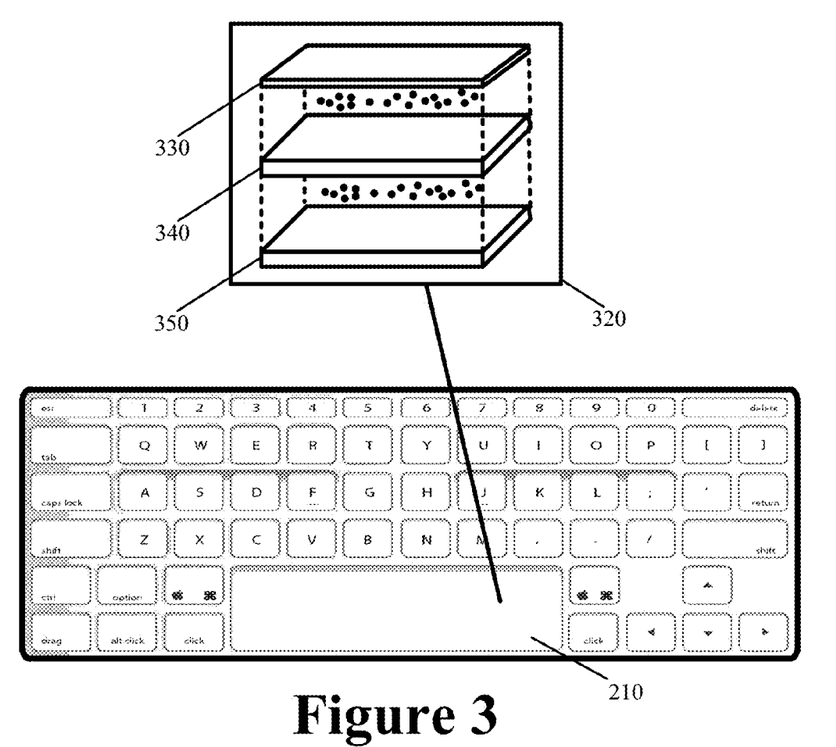
FIG. 3 illustrates various layers of the touch sensitive spacebar key in accordance with some embodiments.

FIG. 3 illustrates various layers of the touch sensitive spacebar key 210 in accordance with some embodiments. It should be well understood that the following described touch sensing technology is presented as one of any number of methods to ascertain raw touch data from a composite surface or other presence sensing technology. The present invention is able to work with data from a wide range of such technologies, which should be known to one skilled in the art. For example, some technologies provide sensor output even before actual contact. This proximity sensing capability would be utilized, possibly in combination with touch technologies, to further increase the accuracy of certain palm/hand/thumb/finger tracking models. For example, some technologies provide data which allows the host to ascribe geometric shapes to a various contact areas, which can then be used to differentiate thumb touches from finger touches.

As shown in the key detail 320, the touch sensitive spacebar key 210 may comprise three layers 330, 340, and 350. In some embodiments, the layers 330-350 are separated by a flexible insulating material. The first or topmost layer 330 is a protective layer. The protective layer may be composed of a thin glass or plastic material. In some embodiments, the second layer 340 and the third layer 350 are touch sensitive layers that may be coated with resistive materials such as indium tin oxide (ITO). In some embodiments, the second layer 340 includes a set of horizontally spanning electrode strips and the third layer 350 includes a set of vertically spanning electrode strips that create an array of x and y sensors. The controller measures the mutual capacitance from each of the horizontal electrodes to each of the vertical electrodes. When a finger touches the key, the capacitance changes at the electrodes over which the touch occurs. The controller measures the change to produce data such as a touch x-coordinate and a touch y-coordinate.

Figure 4:
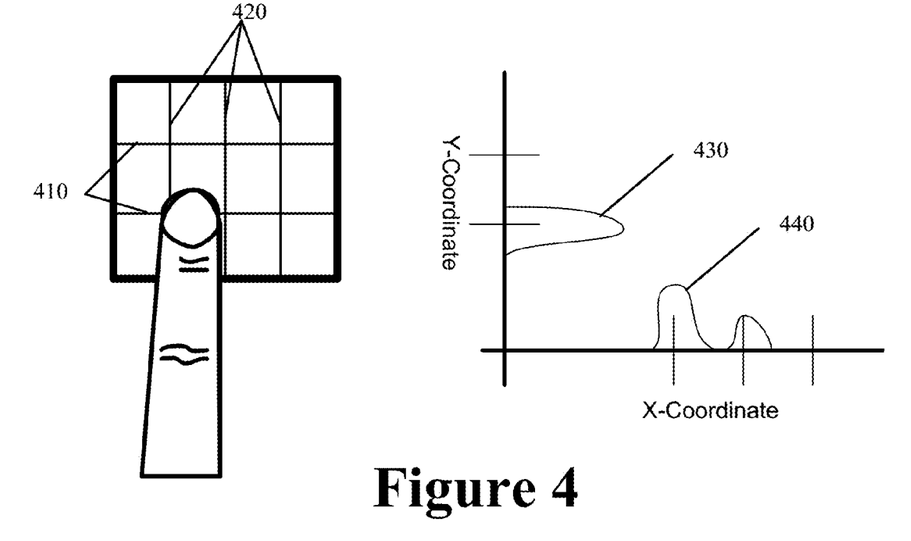
FIG. 4 illustrates generating the touch x-coordinate and the touch y-coordinate from the touch sensitive spacebar key of some embodiments.

FIG. 4 illustrates generating the touch x-coordinate and the touch y-coordinate from the touch sensitive spacebar key of some embodiments. As shown, the touch sensitive spacebar key includes two horizontally spanning electrode strips 410 and three vertically spanning electrode strips 420. When the spacebar is touched at a particular location, the capacitance changes at that location. The controller produces intensity signals 430 and 440 based on the change in capacitance. The intensity signals 430 and 440 can then be converted into a touch x-coordinate and a touch y-coordinate.

Figure 5:
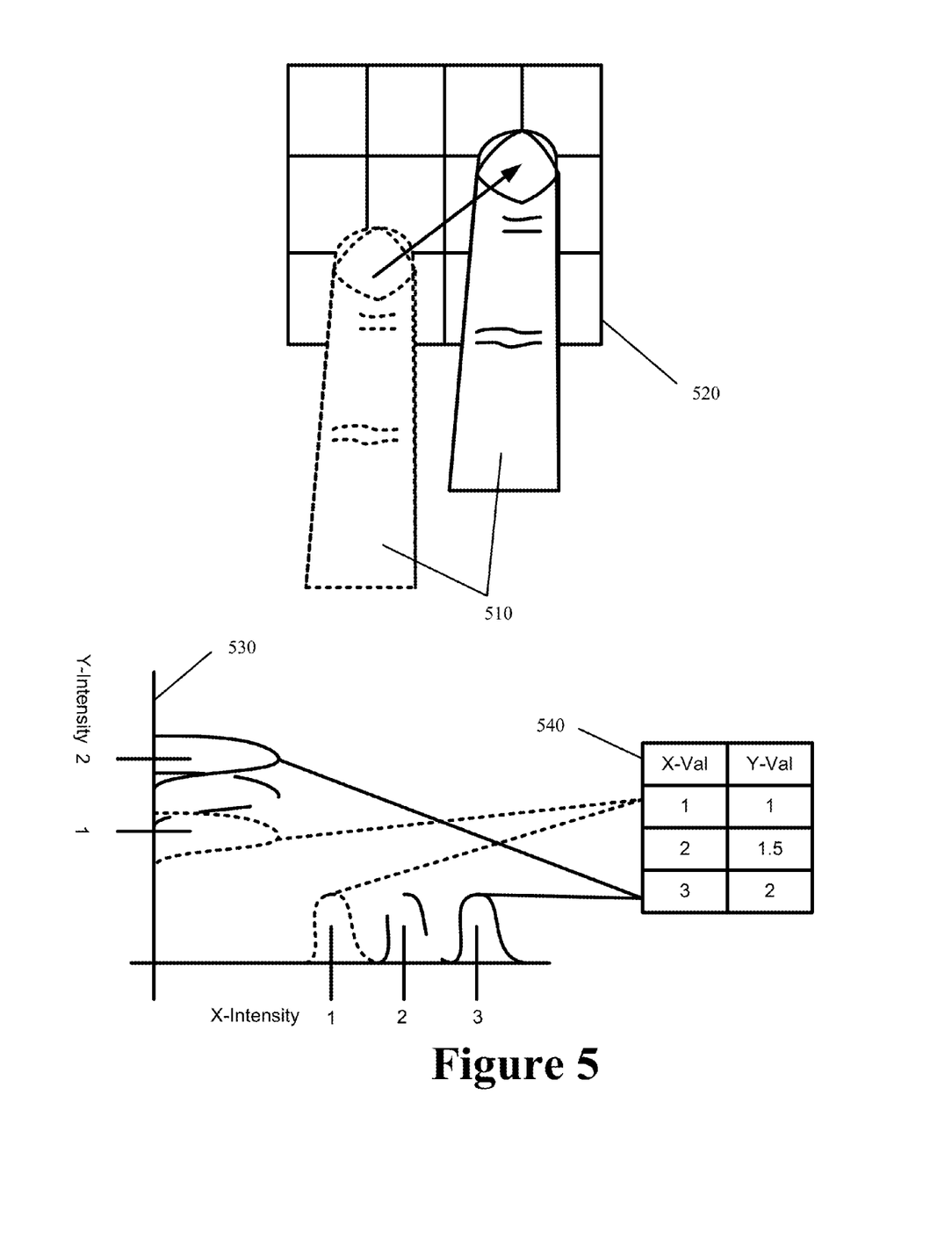
FIG. 5 illustrates motion tracking across the touch sensitive spacebar key in accordance with some embodiments.

FIG. 5 illustrates motion tracking across the touch sensitive spacebar key in accordance with some embodiments. This figure illustrates finger 510 moving from the lower left portion of the touch sensitive key 520 to the upper right portion of the key 520. The graph 530 illustrates changes in signal intensity as the finger moves. The table 540 lists the x and y coordinates that are derived from the intensity signals, and that represent motion using x and y coordinate values.

In some embodiments, the controller creates real-time events based on the x and y coordinates to enable the trackpad functionality. Each of the events may include zero or more data including the number of touches involved with the event, the time of the event, the unique id of the event, the status of the event (e.g. began, moved, ended), and the x and y coordinates of each touch of the event, together with shape, angle and other such parameters of sensor data analysis. Such data may be sent in a variety of forms such as (1) a data structure with parameters such as those just listed, (2) raw data wherein values from the individual sensors of the touch sensitive keys or spacebar key are sent, (3) binary wherein the began and ended status is sent and the moved status is ignored, (4) slider emulation wherein values representing motions are sent, and (5) trackpad emulation wherein x and y coordinates and other relevant trackpad data such as move, click, drag, scroll and the like are sent.

Touch data may further be categorized by the controller into various combinations of touch, hold, tap, slide, flick motions. Such motions can be used for any number of output action invocations. Also, detected touch motions atop the touch sensitive spacebar key can employ dynamic inertial scrolling techniques, wherein a flick causes a value to continue to change for some time period after a touch is released or until a new touch is detected on the touch sensitive key. The speed and characteristics of such motions are proportional to the rate at which the value is modified, such that the resulting effect is similar to inertial scrolling techniques which should be evident to one skilled in the art.

As noted above, the controller and/or software associated with the enhanced keyboard allows for the seamless transitioning between text insertion and trackpad functionality. To do so, the controller operates in one of three states whereby inputs are adapted differently depending on which state is active. The states include a "lock" state whereby the enhanced keyboard can be used for text insertion (typing), a "partial lock" state whereby the touch sensitive spacebar can be used to perform some trackpad functionality such as mouse pointer moves, and prevent other trackpad functionality such as mouse clicks, and an "unlock" state whereby the touch sensitive spacebar in combination with at least one keyboard key can be used to perform full trackpad functionality including "mouse-up" and "mouse-down" functionality further described below.

Figure 6:
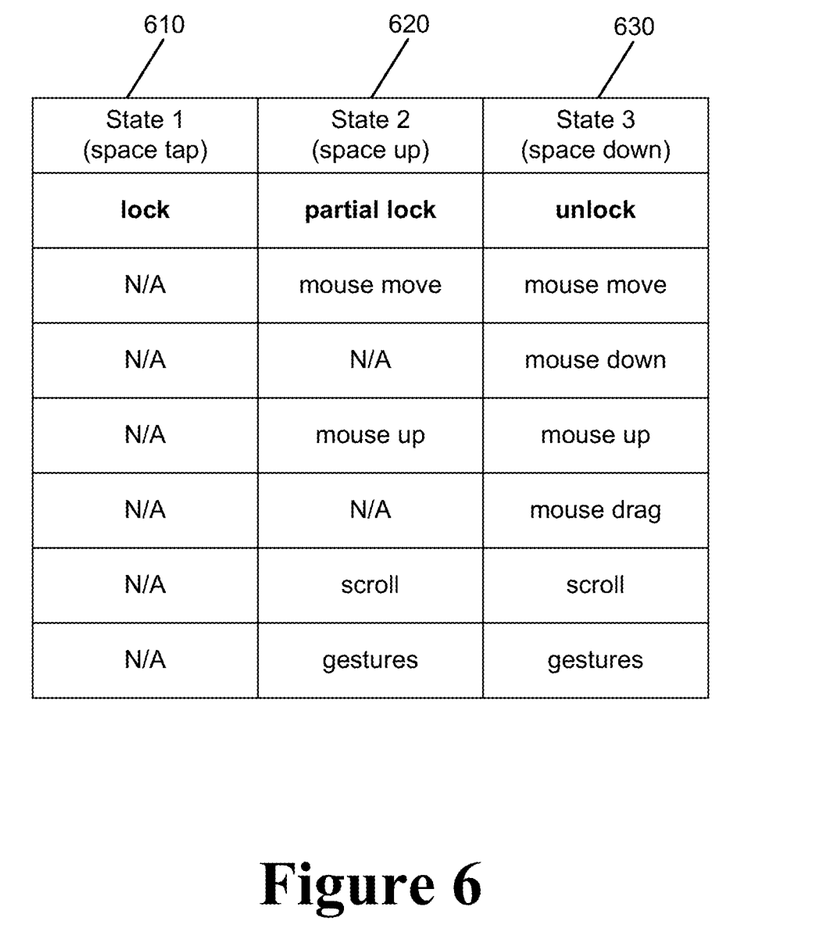
FIG. 6 summarizes the accessible functionality of the enhanced keyboard when in the lock, partial lock, and unlock states.

FIG. 6 summarizes the accessible functionality of the enhanced keyboard when in the lock 610, partial lock 620, and unlock states 630. The lock state 610 becomes active in some embodiments when key presses and key releases occur using the keyboard keys. This state 610 is used to adapt inputs for traditional keyboard text insertion or typing functionality. Specifically, when the lock state 610 is active, the software generates key events based on keyboard key presses and key releases. In some embodiments, each generated event identifies a key that is tapped, pressed, held, or released. These events are passed to the OS, a frontmost application, or other event handler of the host device for processing. In some embodiments, so long as a key press or release occurs within a 20 millisecond (ms) interval of another key press or release, touches that are detected over the touch sensitive spacebar key are ignored by the controller and not adapted for trackpad functionality. Accordingly, users may rest their thumbs over the spacebar key and tap the spacebar key (inserting a space character) while typing without performing unintended on-screen pointer movements or other trackpad functionality. The 20 ms interval is applicable to a preferred embodiment, however some other embodiments may utilize intervals ranging from 5 ms-200 ms or more depending on preferences of the device manufacturer or user, and such time may vary dynamically based on, for example, various system state parameters or which key(s) are pressed/released. For example, pressing or holding a "flag" key (e.g., "ctrl", "option", "alt", "shift", etc.) may shorten or eliminate the interval time, so that subsequent key presses or trackpad functionality can be registered in combination with the pressed or held flag key to perform some combinational function such as multiple line selections or performing option clicks. Moreover, the inputs in the lock state 610 are described as being adapted for text insertion. However, the events generated in this state may also be used by an OS, frontmost application, or other event handler to invoke various output actions that would otherwise be invoked using keyboard shortcuts, keyboard key presses, keyboard key releases, or some combination thereof.

The partial lock state 620 becomes active in some embodiments (1) when no key presses or key releases occur within a 20 ms interval, (2) when the spacebar remains "up" (not pressed), and (3) when touches are detected over the touch sensitive spacebar. In some embodiments, the controller registers a touch on the spacebar when the touch is not moved beyond some distance within a specified time period such that a stationary resting of a thumb or finger over the spacebar would register as a resting touch rather than an active touch. In some embodiments, the controller registers a touch when the finger, thumb, or combination of fingers issuing the touch moves some specified distance on the touch sensitive spacebar (e.g., one millimeter). When the partial lock state 620 is active, the controller and/or software does not generate "mouse-down" or "mouse-up" (mouse button) events, with the exception that a single mouse-up event may be generated if a mouse-down state existed just prior to entering the partial lock state 620. In some embodiments, the partial lock state functionality 620 involves (1) adapting a single touch that is issued on the touch sensitive spacebar key to perform on-screen pointer movement, (2) adapting a two finger (or thumb plus finger or thumb plus thumb) touch movement that is issued on the touch sensitive spacebar key to perform scrolling, and (3) adapting other multi-touch gestures that are issued on the touch sensitive spacebar key to perform other trackpad functionality that does not include combination touch/gestures with mouse button presses (e.g., a two finger pinch or spread motion for shrinking or zooming out). In other words, the partial lock state 620 enables most trackpad functionality except mouse click, double-click, drag, and other events involving mouse down and mouse up. For example, when the partial lock state 620 is active, the user can move a single finger touch on the touch sensitive spacebar in order to reposition an on-screen pointer, and/or issue a multi-touch gesture such as (1) simultaneously moving two touches in order to perform scrolling or (2) issuing a two finger pinch or spread gesture in order to perform shrinking or zooming as some examples. These multi-touch gestures may be predefined in the OS of the computing system such that specified events issued from the controller invoke the corresponding functionality without the need to provide the code, functions, or Application Programming Interfaces (APIs) for implementing such functionality. Moreover, other functionality and other touch gestures in addition to or instead of those described above may be accessible when operating in the partial lock state 620.

For example, U.S. provisional patent application Ser. No. 61/465,309 entitled "Touch Enhanced Interface" with a filing date of Mar. 17, 2011 describes some such functionality and gestures.

Figure 7:
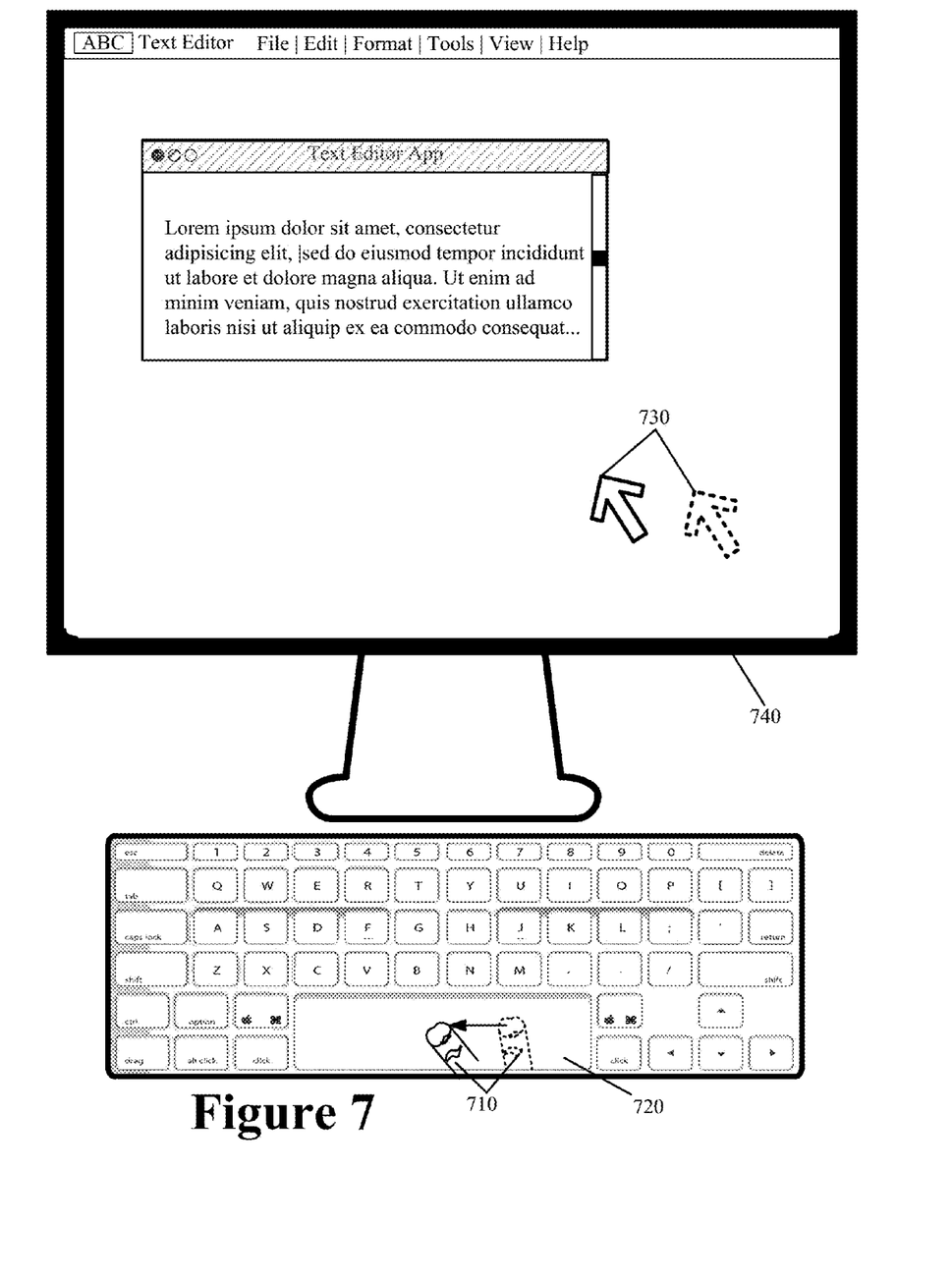
FIG. 7 illustrates controlling on-screen pointer movements using touch movements across the touch sensitive spacebar of the enhanced keyboard when the partial lock state is active in accordance with some embodiments.

FIG. 7 illustrates controlling on-screen pointer movements using touch movements across the touch sensitive spacebar of the enhanced keyboard when the partial lock state 620 is active in accordance with some embodiments. As shown, the user's thumb 710 slides on the touch sensitive spacebar 720. The thumb motion follows a horizontal path with a slight upwards motion at the end of the movement. The thumb motion produces the pointer motion 730 shown in the graphical display 740.

The distance of the pointer motion 730 is determined by the distance the user's thumb travels on the touch sensitive spacebar 720. In some embodiments, there is a one to one correspondence between the distance of the physical thumb movement and the distance of the on-screen pointer movement. In some other embodiments, there is a proportional correspondence (e.g., 1:2 correspondence) between the distance of the physical thumb movement and the distance of the on-screen pointer movement. The proportional correspondence may be determined from the screen resolution, other system settings, or preferences. There may also be a non-linear correspondence between the distance of the physical thumb movement and the distance of the on-screen pointer movement, such that other factors, such as acceleration and speed, determine the actual pointer movement. Such techniques would be evident to one skilled in the art. In some embodiments, such pointer movements follow established protocols and utilize existing peripheral protocols.

As the user's thumb 710 slides on the spacebar 720, the controller obtains a set of touch coordinates that identify the touch and movement. The controller then either passes the set of touch coordinates to the OS (or other process) as raw data, or converts the set of touch coordinates to events that produce the corresponding trackpad or other functionality on the computing system.

From the set of touch coordinates, the controller or the OS determines a number of non-resting simultaneous or nearly simultaneous touches. This determination is necessary when generating the events that identify the appropriate resulting trackpad or gesture functionality. Specifically, whether the coordinates or generated events should be used in performing single finger pointer movements or multi-touch gestures for scrolling, expansion, contraction, or rotation as some examples.

In some embodiments, the unlock state 630 becomes active when the spacebar is held down beyond a specified duration and zero or more additional touches are detected on the spacebar surface. In this state 630, the surface of the spacebar gains full trackpad functionality, and acts similarly to a separate device or traditional trackpad. As shown in FIG. 6, from the unlock state, the touch sensitive spacebar of the enhanced keyboard can be used to perform any combination of (1) mouse move functionality (e.g., on-screen pointer movements, (2) perform mouse-down and mouse-up functionality (e.g., mouse click, double-click, and hold), (3) mouse select and drag, (4) scrolling, and (5) other trackpad gestures as may be defined by system preferences.

Figure 8:
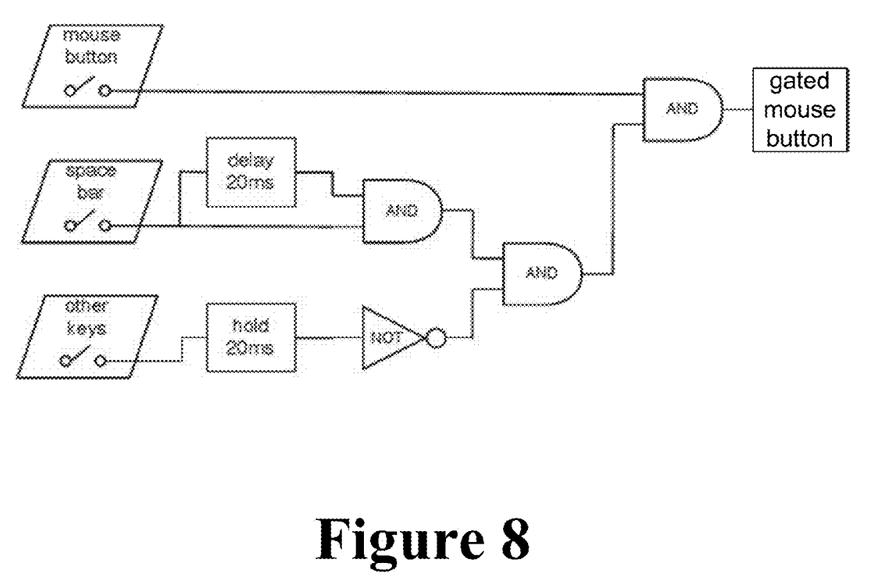
FIG. 8 provides a simplified state diagram which exemplifies when various states of the enhanced keyboard of some embodiments become active.

FIG. 8 provides a simplified state diagram which exemplifies when various states of the enhanced keyboard of some embodiments become active. It should be noted that even though simplified logic symbols are used to depict essential state changing from partial lock to unlock states, the actual software implementation is more complex in that, for example, it allows mouse-up messages to pass through in certain cases, as disclosed above. As shown in FIG. 8, mouse button activity is only active when no key presses or key releases occur within a 20 ms interval, and when the spacebar is pressed and held down for at least 20 ms. In other words, the holding down of the touch sensitive spacebar allows mouse-down and mouse-up actions, such as clicks or button presses, to be registered on the spacebar using taps or touches, as long as other keys are not simultaneously being used. For example, the right thumb may be used to position the on-screen pointer (whether the space bar is down or not), then a button click is registered by holding down the spacebar for the 20 ms interval with the left thumb while the right thumb taps on the touch sensitive spacebar. The tap can be used to select a GUI element by highlighting a GUI element over which the on-screen pointer hovers, or invoking a corresponding output action where invoking the output action may be performed with a single tap that corresponds to a single button click or a double tap that corresponds to a double click (for example, opening a document that is associated with an icon). Additionally, when the unlock state is active, the enhanced keyboard can be used to perform click and drag combinational operations. For example, a GUI element may be selected by (1) holding down the spacebar to enable the unlock state functionality, (2) using a single finger touch to position an on-screen pointer over a desired GUI element, and then (3) performing a three finger touch and drag to move the desired GUI element to a different on-screen position.

In an alternative embodiment, a specified key such as the "V" key acts as the mouse button such that a tap of the "V" key results in a mouse click, a double tap results in a double-click, pressing and holding the "V" key enables drag operations, etc. Such specified keys would not switch to the partial lock state. In some embodiments, a single touch tap or double tap on the touch sensitive spacebar can be used to invoke the output action that is identified by the UI element, and this functionality may be switched on/off when utilizing a keyboard with multiple touch sensitive keys when, for instance, certain fingers are in contact with (but not pressing) other touch sensitive keys such as certain "home" keys. Alternatively, from the unlock state, a click and drag operation can be performed by (1) holding down the spacebar to enable the unlock state functionality, (2) using a single finger touch to position an on-screen pointer over a desired UI element, (3) pressing and holding a particular keyboard key (e.g., "V" key) to select the desired UI element, and (4) while continuing to hold the particular keyboard key, using a single finger touch to drag the desired UI element to a different on-screen position, and then releasing the key to complete the move.

In some embodiments, the controller generates the appropriate events that emulate the unlock state trackpad functionality. Specifically, the controller converts a touch or tap issued over the spacebar into the corresponding events for a button press or click and a three finger hold and drag into the corresponding events for a click and drag. Consequently, users can access the full complement of trackpad functionality through the touch sensitive spacebar. In this manner, the enhanced keyboard of some embodiments serves as a single input device that provides complete functionality of a keyboard and a trackpad.

Figure 9:
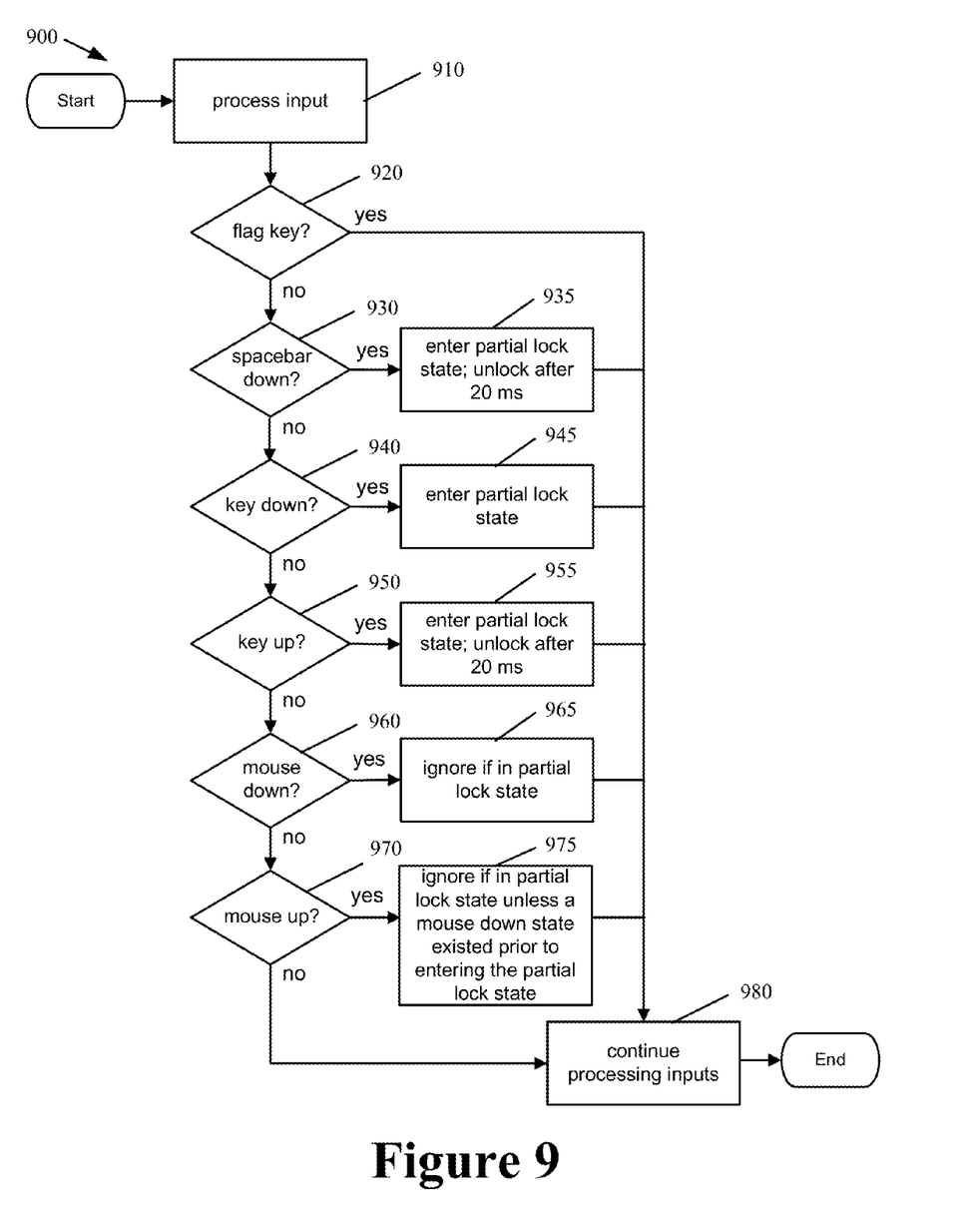
FIG. 9 presents a process performed by the software and/or controller of the enhanced keyboard of some embodiments to summarize the seamless transitioning between the partial lock state and unlock state modes of operation in accordance with some embodiments FIG. 10 provides a flow diagram of some embodiments of the enhanced keyboard which shows an overall process from input to output.

FIG. 9 presents a process 900 performed by the software and/or controller of the enhanced keyboard of some embodiments to summarize the seamless transitioning between the partial lock state and unlock state modes of operation in accordance with some embodiments.

The process 900 begins by receiving and processing (at 910) input events. These events may include any combination of key presses, key releases, and various touches such as touch began, moved, or ended on the touch sensitive spacebar of the enhanced keyboard. The process determines (at 920) whether the received input indicates that a "flag" key was pressed where the flag key includes one or more of the "ctrl", "alt", "option", and "shift" keys among other known flag keys. When a flag key is detected at 920, the process continues (at 980) processing the flag key input as it otherwise would have done.

If no flag key is detected at 920, the process then determines (at 930) whether the received input indicates that the spacebar was pressed. If so, the process enters (at 935) or remains in the partial lock state and until some specified duration (i.e., 20 ms) when it enters the unlock state. Otherwise, the process determines (at 940) whether the received input indicates that a key other than a flag key or spacebar is pressed. If so, the process enters (at 945) the partial lock state. Otherwise, the process determines (at 950) whether the received input indicates that a key has been released. If so, the process enters (at 955) or remains in the partial lock state and then after some specified duration (i.e., 20 ms) enters the unlock state. Otherwise, the process determines (at 960) whether the received input indicates that a mouse down event was received. If so, the process ignores (at 965) the mouse down state if the partial lock state is active, but otherwise continues the process (at 980) where the mouse down will be handled as normal. Lastly, the process determines (at 970) whether the received input indicates that a mouse up event was received. If the partial lock state is active, the process will ignore (at 975) the mouse up event, unless a mouse down state existed just prior to entering the partial lock state, and so the mouse up event will be allowed to continue to be processed as normal. If a mouse up event is allowed to pass in the partial lock state, further mouse up events are ignored until the next unlock mode becomes active. After each of steps 935, 945, 955, 965, 970 and 975, the process continues to process inputs based on the active state and subsequent input events are processed according to the process 900. It should be noted that mouse moved events are treated as mouse down events. Also, it should be noted that in embodiments where keys are used to activate digit indicators, further logic is required to retain the unlock state while the spacebar is down.

Figure 10:
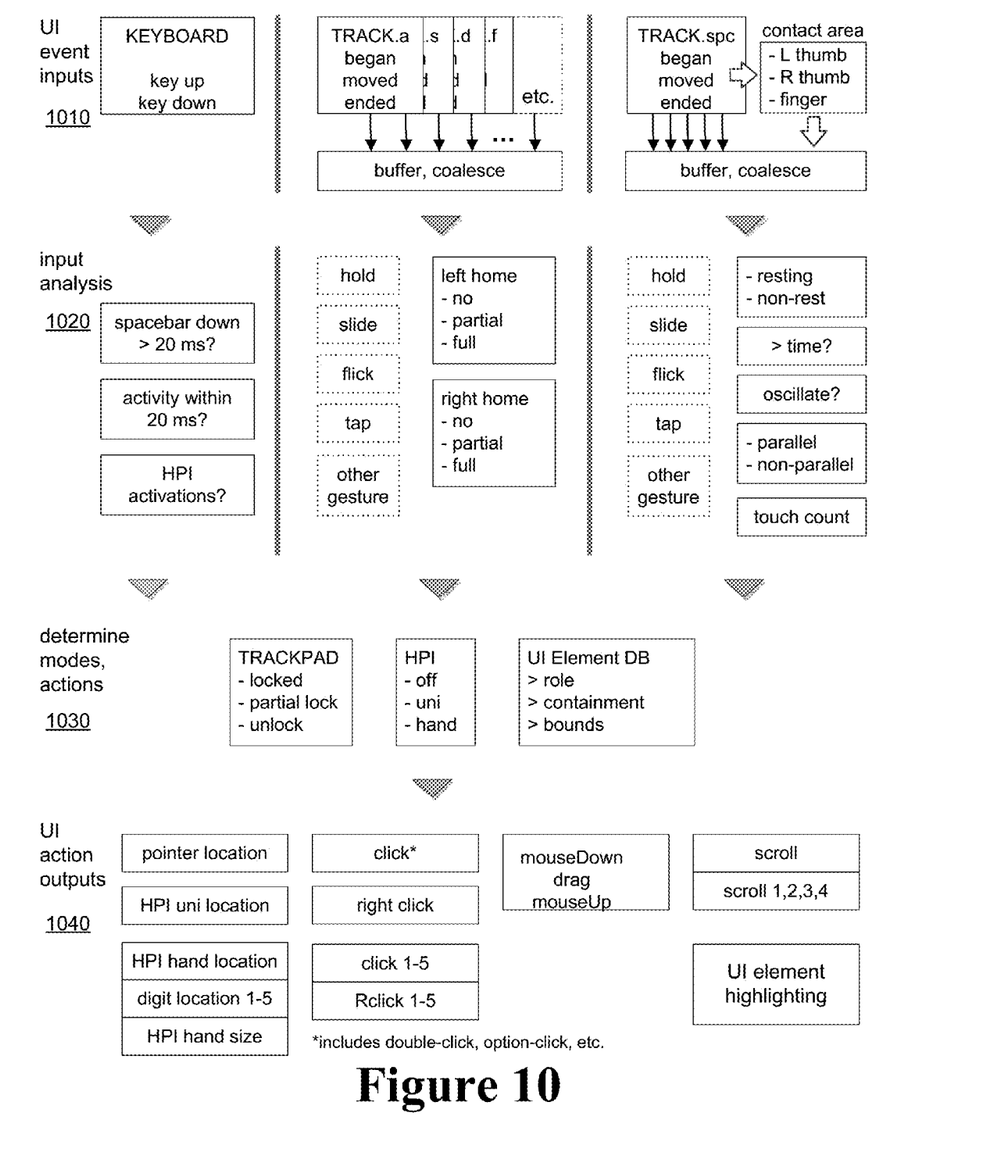

The figures and description above provide core functionality for the enhanced keyboard. However, this functionality may be enhanced or modified with respect to various input events, input analysis, modes/states, constructs and output actions to allow for more extensive application of the previously described embodiments. FIG. 10 provides a flow diagram of some embodiments of the enhanced keyboard which shows an overall process from input to output. In this figure, the below described embodiment incorporates functionality that is incorporated in United States provisional patent application entitled "Enhanced Pointer Tools for Graphical User Interfaces" with Ser. No. 61/493,523, a filing date of Jun. 6, 2011 and that references the "Hand Pointer Interface" and "HPI".

At the top of the diagram as shown at 1010, UI inputs are shown along with specific events that are generated. To the left, key up and key down events are shown, which are generated by the key switches for each of the keys. In the middle, the outputs of the individual key touch sensors are shown, one per key. For instance, the "A" key is shown, with a touch sensor outputs events such as began, moved, and ended. Other embodiments may provide different event messages such as proximity, and some embodiments may use technologies other than or in combination with touch to determine the events to be generated. As depicted to the right of the "A" key is the "S" key which provides similar events, as do the rest of the keys for which touch sensitivity is provided. It should be noted that some embodiments implement such tracking only on the home keys, on no keys, on all keys, or some other permutation. In some embodiments, each key provides multiple touch tracking capabilities, and in other embodiments, such tracking is provided for single touch per-key tracking only. The combination of individual key touch events are read into a buffer and coalesced so that the totality of the data may be interpreted cohesively.

Moving to the top right of the diagram, the tracking for the spacebar can be seen, with multiple arrows extending downward indicating that multiple touches are simultaneously sensed and fed into the buffer. Also, the tracking mechanism provides additional data sufficient to determine the individual contact areas for each touch so that it can be determined if the touch was made by the left thumb, right thumb, or a finger. In some embodiments, the controller of the enhanced keyboard interprets such data, makes a classification, and includes such in the stream of events that it sends to the host.

The next step after the inputs are gathered involves analysis of such data as shown at 1020. As can be seen in the "input analysis" section, the key events are analyzed and several determinations are made, such as whether the spacebar has been down for over 20 ms, or if any key up or down activity has occurred with the last 20 ms. Also, if an HPI mode is active, whether a specific key or keys should activate some functionality. In the middle of the input analysis section, the buffer from the key sensors are analyzed to categorize into constructs such as a hold, slide, flick, tap, or other type of gesture. Also determined is whether all fingers are touching the home keys, no fingers are touching the home keys, or some fingers are touching or hovering above the home keys, or have been in the proximity within the last variable period of time. In the right portion of the input analysis section of the diagram, various spacebar tracking analysis categorizes the buffer data into similar constructs such as hold, slide, flick, tap, and other gestures. Additionally, a determination is made for each touch as to whether it is resting, or has not moved beyond a specified distance, whether it has held a position for a specified time, whether a slide or slides have oscillated back and forth, whether two or more slides are moving in an essential parallel manner, and how many touches are currently in contact.

Next, the process determines at 1030 various states and which output actions should be sent. As discussed previously, some embodiments of the enhanced keyboard have various states for determining the capabilities of the spacebar trackpad such as locked, partial lock, and unlock. From the previously described input analysis, this state can be determined. For instance, in some embodiments, if there is no keyboard activity within 20 ms and no touches are registered on the home keys for the right hand for more than some variable period of time, then the state would be set to unlock, which allows full functionality of the spacebar trackpad, including clicks, whether the spacebar is down or not. Other determinations made include the HPI mode, which may be activated in some embodiments by holding the spacebar down beyond a specified duration. Some embodiments support additional HPI representations such as a single circular area, or multiple areas that snap to UI elements on a horizontal plane. Further detail about such embodiments is provided in the above referenced provisional patent application. Another determination is made as to UI element data which may be needed to perform other functions such as highlighting.

Finally, at the bottom of the diagram, various UI action outputs are shown which illustrate some of the output actions that may be invoked in response to the inputs previously described. Such actions include moving the main pointer, moving the HPI pointer, moving various constituent parts of an HPI pointer, and resizing of the HPI pointer. Other actions include clicking on UI elements, including double-clicking, right-clicking, option-clicking, etc. For HPI implementations with multiple pointer locations (i.e., HPI digit indicator locations 1-5), clicks (e.g., left clicks and right clicks) may be issued on UI elements at those various locations (i.e., HPI digit indicator locations 1-5). Mouse-down and mouse-up events are sent to various UI elements, along with mouse-drag messages if necessary. Scroll messages may be sent to the UI element at the current location of the main pointer, or at the location of the HPI pointer(s), or at locations that have been pre-determined on a per-application basis.

It should be noted that various combinations of input events may determine various modes or constructs, and therefore different output actions may result. Complexity prohibits listing every permutation of such combinations or modes or constructs. Variations on such permutations could be easily conceived, but would nonetheless essentially analogize the above described embodiment, and therefore fall within the purview of the present invention.

The controller of the enhanced keyboard and various processes performed in conjunction with the enhanced keyboard may be implemented as one or more software instructions that are executed by a microprocessor running of the enhanced keyboard or a computer system that utilizes the enhanced keyboard as an input device. The software instructions may be recorded to a non-transitory computer-readable storage medium (also referred to as computer-readable medium) thereby providing an article of manufacture in conjunction with or independent of the hardware of the enhanced keyboard. When these instructions are executed by one or more computational element(s) (such as processors or other computational elements like ASICs and FPGAs), they cause the computational element(s) (i.e., microprocessor) to perform the actions indicated in the instructions. Server, computer, and computer system are meant in their broadest sense, and may include any electronic device with a processor that executes instruction stored on computer-readable media or that are obtained remotely over a network connection. Examples of computer-readable media include, but are not limited to, CD-ROMs, flash drives, RAM chips, hard drives, EPROMs, etc. Further, wherever a server, computer, or computer system is identified as a component of the embodied invention, it is understood that the server, computer, or computer system may be a single physical machine, a cluster of multiple physical machines performing related functions, virtualized machines co-resident on a single physical machine, or various combinations of the above.

Figure 11:
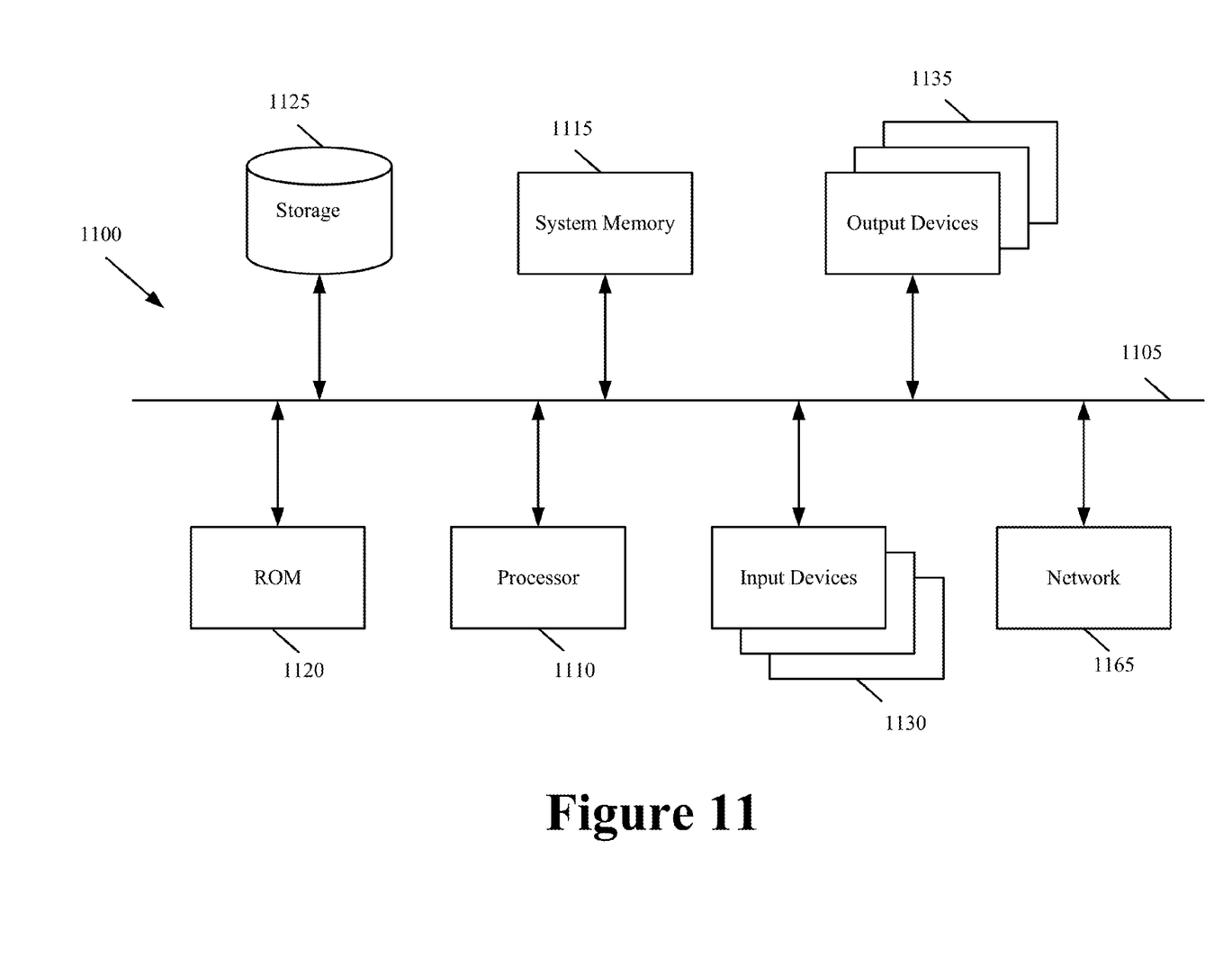
FIG. 11 illustrates a computer system with which some embodiments are implemented.

FIG. 11 illustrates a computer system with which some embodiments are implemented. Such a computer system includes various types of computer-readable mediums and interfaces for various other types of computer-readable mediums that implement the various processes, modules, viewers and engines described above. Computer system 1100 includes a bus 1105, a processor 1110, a system memory 1115, a read-only memory 1120, a permanent storage device 1125, input devices 1130, and output devices 1135.

The bus 1105 collectively represents all system, peripheral, and chipset buses that communicatively connect the numerous internal devices of the computer system 1100. For instance, the bus 1105 communicatively connects the processor 1110 with the read-only memory 1120, the system memory 1115, and the permanent storage device 1125. From these various memory units, the processor 1110 retrieves instructions to execute and data to process in order to execute the processes of the invention. The processor 1110 is a processing device such as a central processing unit, integrated circuit, graphical processing unit, etc.

The read-only-memory (ROM) 1120 stores static data and instructions that are needed by the processor 1110 and other modules of the computer system. The permanent storage device 1125, on the other hand, is a read-and-write memory device. This device is a non-volatile memory unit that stores instructions and data even when the computer system 1100 is off. Some embodiments of the invention use a mass-storage device (such as a magnetic or optical disk and its corresponding disk drive) as the permanent storage device 1125.

Other embodiments use a removable storage device (such as a flash drive) as the permanent storage device Like the permanent storage device 1125, the system memory 1115 is a read-and-write memory device. However, unlike the storage device 1125, the system memory is a volatile read-and-write memory, such as random access memory (RAM). The system memory stores some of the instructions and data that the processor needs at runtime. In some embodiments, the processes are stored in the system memory 1115, the permanent storage device 1125, and/or the read-only memory 1120.

The bus 1105 also connects to the input and output devices 1130 and 1135. The input devices enable the user to communicate information and select commands to the computer system. The input devices 1130 include any of a capacitive touchscreen, resistive touchscreen, any other touchscreen technology, a trackpad that is part of the computing system 1100 or attached as a peripheral, a set of touch sensitive buttons or touch sensitive keys that are used to provide inputs to the computing system 1100, or any other touch sensing hardware that detects multiple touches and that is coupled to the computing system 1100 or is attached as a peripheral. The input device 1130 also include alpha-numeric keypads (including physical keyboards and touch-screen keyboards), pointing devices (also called "cursor control devices"). The input devices 1130 also include audio input devices (e.g., microphones, MIDI musical instruments, etc.). The output devices 1135 display images generated by the computer system. The output devices include printers and display devices, such as cathode ray tubes (CRT) or liquid crystal displays (LCD).

Finally, as shown in FIG. 11, bus 1105 also couples computer 1100 to a network 1165 through a network adapter (not shown). In this manner, the computer can be a part of a network of computers (such as a local area network ("LAN"), a wide area network ("WAN"), or an Intranet, or a network of networks, such as the Internet. For example, the computer 1100 may be coupled to a web server (network 1165) so that a web browser executing on the computer 1100 can interact with the web server as a user interacts with a GUI that operates in the web browser.

As mentioned above, the computer system 1100 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the present invention has been described with reference to numerous specific details, one of ordinary skill in the art will recognize after disclosure that the invention can be embodied in other specific forms, yet these would not depart from the scope and spirit of the invention as herein disclosed.

The invention claimed is:

1. A computer system comprising:
    a touch sensitive key-based input device comprising at least a first key with a touch sensitive surface and a second key with a touch sensitive surface, each key of the first and second keys generating touch input when sensing touch over the key and generating down and up inputs when the key is physically depressed and released;
    a processor coalescing input from the plurality of keys to perform different sets of output actions of a plurality of operational modes, wherein coalescing said input comprises entering a first operational mode of the plurality of operational modes in response to receiving first key down input indicating a press and hold of the first key for at least a defined interval, performing an output action from a first set of output actions of the first operational mode in response to receiving second key touch input while continuing to receiving the first key down input, and exiting the first operational mode in response to first key up input indicating a release of the first key, wherein exiting the first operational mode disables the second key touch input from further performing any output action of the first set of output actions.

2. The computer system of claim 1, wherein coalescing said input further comprises entering a second operational mode of the plurality of operational modes in response to receiving third key down input indicating a press and hold of a third key of the plurality of keys for at least the defined interval, wherein entering the first operational mode enables access to the first set of output actions and entering the second operational mode enables access to a different second set of output actions.

3. The computer system of claim 2, wherein the second key touch input determines which output action of the first set of output actions is performed when the first key is pressed and held for at least the defined interval and the second key touch input determines which output action of the second set of output actions is performed when the third key is pressed and held for at the defined interval.

4. The computer system of claim 1, wherein the second key touch input comprises any of a user touch sliding in one of a plurality of directions over the second key, and wherein sliding the user touch in a first direction of the plurality of directions performs a first output action of the first set of output actions when in the first operational mode and sliding the user touch in a second direction of the plurality of directions performs a second output action of the first set of output actions.

5. The computer system of claim 4, wherein the second key touch input further comprises any of a user touch flicking in one of a plurality of directions over the second key, and wherein flicking the user touch in a first direction of the plurality of directions performs a third output action of the first set of output actions and flicking the user touch in a second direction of the plurality of directions performs a fourth output action of the first set of output actions.

6. The computer system of claim 5, wherein the user touch sliding comprises a touch applied at a first position of the second key and moved to a second position of the second key without immediate release of the touch, and wherein the user touch flicking comprises a touch applied at the first position of the second key and moved to the second position of the second key with immediate release of the touch.

7. The computer system of claim 1, wherein down input followed by up input from the first key within the defined interval results in insertion of a first character and down input followed by up input from the second key within the defined interval results in insertion of a second character having a different alphanumeric value than the first character.

8. The computer system of claim 1, wherein performing the output action from the first set of output actions of the first operational mode comprises performing a pointer operation involving any of a pointer movement, click action, drag operation, and scrolling operation.

9. The computer system of claim 1, wherein the first set of output actions comprises a first set of trackpad emulation functionality.

10. The computer system of claim 9, wherein the processor further performs a different second set of trackpad emulation functionality in response to receiving second key touch input without a press and hold of any key of the plurality of keys.

11. The computer system of claim 10, wherein the first set of trackpad emulated functionality includes mouse click messages and the second set of trackpad emulated functionality excludes mouse click messages.

12. A computer system comprising:
a touch sensitive key-based input device comprising a plurality of keys generating down and up inputs in response to a user physically depressing and releasing the plurality of keys, the touch sensitive key-based input device further comprising a first key of the plurality of keys with a touch sensitive surface and a second key of the plurality of keys with a touch sensitive surface located adjacent to the first key, the first key generating first touch input in response to at least a start or an end of a user touch over the first key, and the second key generating second touch input in response to at least a start or an end of a user touch over the second key; and
a processor coalescing input from the plurality of keys, where said coalescing the input comprises tracking movement of a continuous user touch from the first key to the second key in response to receiving the first touch input identifying the start of the user touch over the first key, receiving the second touch input identifying the start of the user touch over the second key while continuing to receive the first touch input identifying the user touch over the first key, and receiving the first touch input identifying the end of the user touch over the first key while continuing to receive the second touch input identifying the user touch over the second key.

13. The computer system of claim 12, wherein the processor performs a first output action in response to said tracking of the continuous user touch from the first key to the second key.

14. The computer system of claim 13, wherein the processor performs a different second output action in response to tracking a continuous user touch from the second key to the first key.

15. The computer system of claim 13, wherein the first output action comprises highlighting said movement within a graphical user interface (GUI) of the computer system.

16. The computer system of claim 15, wherein highlighting said movement comprises graphically representing the coalescing of said touches in the GUI by placing a single user touch highlight over a representation of the first key in response to receiving first key touch input without second key touch input, placing a single user touch highlight between a representation of the first key and the second key in response to simultaneously receiving first key touch input and second key touch input, and placing a single user touch highlight over a representation of the second key in response to receiving second key touch input without first key touch input.

17. The computer system of claim 13, wherein the first output action comprises moving a pointer across a GUI of the computer system in relation to tracking the movement of the continuous user touch from the first key to the second key.

18. The computer system of claim 13, wherein the first output action comprises moving an indicator across a representation of the plurality of keys in the GUI of the computer system in relation to tracking the movement of the continuous user touch from the first key to the second key.

19. The computer system of claim 13, wherein the first output action comprises scrolling within a scroll area in relation to tracking the movement of the continuous user touch from the first key to the second key.

* * * * *